(No Model.)
J. B. WEST.
APPARATUS FOR SLITTING EMBROIDERY.
No. 291,116. Patented Jan. 1, 1884.
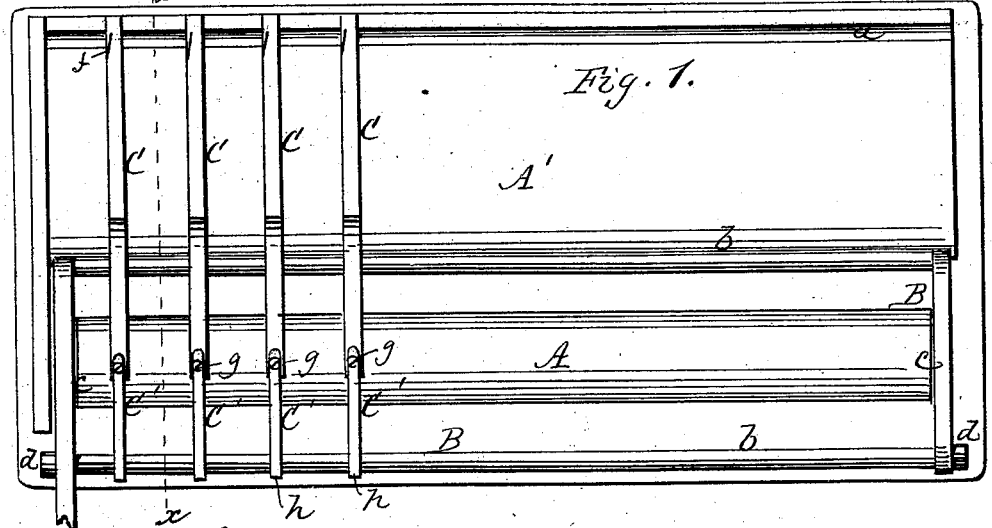
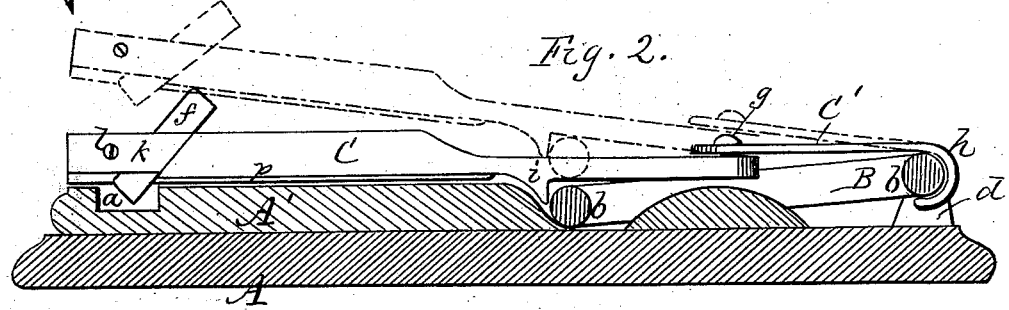
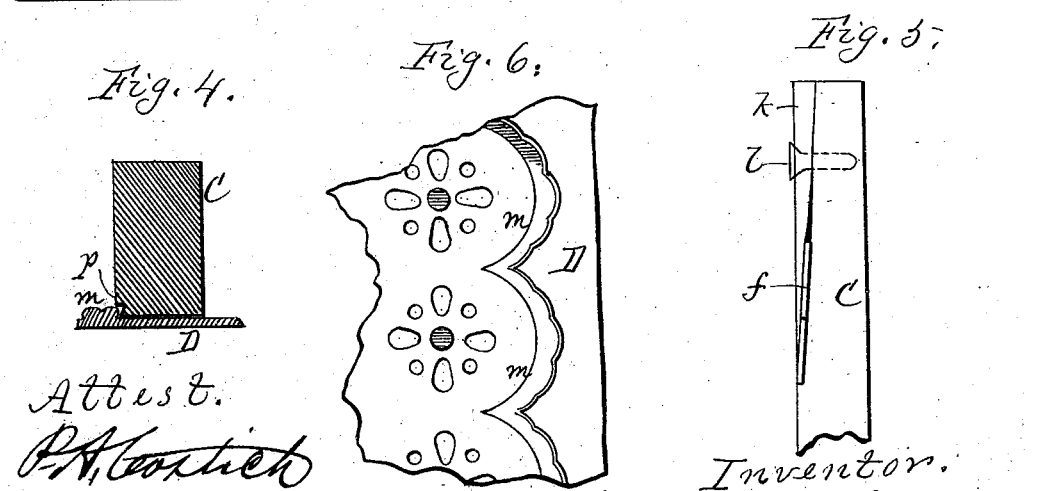
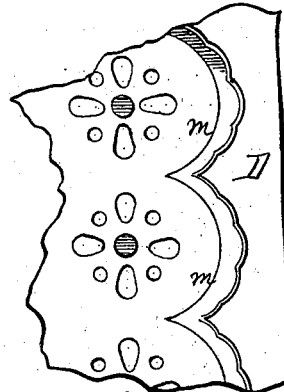
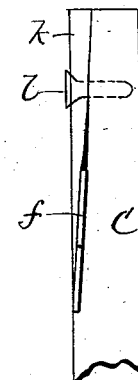
Attest.
P. H. Gostich
Purio G. Clark
Inventor.
Jonathan B. West,
per R. L. Osgood,
atty.

UNITED STATES PATENT OFFICE.

JONATHAN B. WEST, OF ROCHESTER, NEW YORK.

APPARATUS FOR SLITTING EMBROIDERY.

SPECIFICATION forming part of Letters Patent No. 291,116, dated January 1, 1884.

Application filed April 2, 1883. (No model.)

*To all whom it may concern:*

Be it known that I, JONATHAN B. WEST, of Rochester, Monroe county, New York, have invented a certain new and useful Improvement in Apparatus for Slitting Embroidery; and I do hereby declare that the following is a full, clear, and exact description of the same, reference being had to the accompanying drawings, in which—

Figure 1 is a plan of the apparatus. Fig. 2 is a cross-section (enlarged) in line $xx$ of Fig. 1. Fig. 3 is a bottom view of one of the knife-stocks. Fig. 4 is a cross-section of same enlarged, and showing the method of guiding the knife on the cloth. Fig. 5 is a top view of one end of the knife-stock. Fig. 6 is a plan showing a fragment of the embroidered sheet which is to be slitted.

Ordinary embroideries or edgings are worked upon a sheet or breadth of cloth in lines at regular intervals apart, and the sheet is then slitted lengthwise between the lines making the strips, which are then to be trimmed and notched for use. The ordinary way of slitting the sheet is by the use of shears and by hand, which involves great labor and takes much time.

The object of my invention is to do the work by machinery and to slit the whole sheet or any desired portion thereof at one operation, by simply drawing the sheet over a platform or bed under a series of knives, which are guided in their cutting by a gage on the knife-stock, which rests in contact with and is controlled by the raised ridge of embroidery on the sheet, as hereinafter described.

In the drawings, A shows the table or bed, over which the embroidered sheet is drawn to be slitted, said table consisting of a plain platform of wood, but having, preferably, a raised front portion, A', to increase friction on the cloth and keep it straight in drawing through, and also to accommodate the form of the knives. In the front of the table is made a longitudinal groove, $a$, on top, within which rest the lower corners of the knives, as shown in the cross-section, Fig. 2.

B is a frame, consisting of two longitudinal rods or bars, $b\ b$, which rest over the rear portion of the bed, behind the elevated portion A', said bars being united at the ends by stringers $c\ c$, one of which (that at the left) extends outward and backward and forms a handle or lever, by which the frame is operated. The front bar $b$ is entirely free; but the rear one is journaled at its ends in suitable bearings, $d\ d$, by which means it will be seen that the front portion of the frame will be elevated when pressure is applied upon the handle. The embroidered sheet is placed in position on the bed by inserting it under the rear bar $b$, (which is high enough for the purpose,) and then inserting it under the front bar by raising the frame, as described, and then letting the frame down, the front bar resting on top of the cloth and serving as a brake to produce friction on the cloth as it is drawn through by the hands of the operator.

C C are a series of knife-stocks, to which are attached thin knives $f\ f$, by which the slitting is done. There are as many of these knife-stocks as there are lines of embroidery on the sheet to be slitted. Each of these stocks consists of two parts—a stiff bar, C, in front, to which the knife is attached, and an arm, C', in the rear, pivoted vertically at $g$ to the rear end of the bar, so as to allow the bar to swing in either direction horizontally, and provided at its rear end with an open hook, $h$, which hooks upon the rear bar $b$, as shown in the sectional view, Fig. 2. The bar C has also on its under side a spur, $i$, which strikes over the front bar $b$, by which, when the frame B is raised, the knife-stocks will be raised with it and will be prevented from slipping back out of place. The knife $f$ consists of a very thin blade of steel, set in the inclined form shown, its lower corner striking down into the groove $a$, below the surface of the bed, and this knife is also set at an angular position relatively to the length of the bar, as shown in the top view, Fig. 5, by which means its sharp edge is made to stand in toward the raised line of embroidery and draw in toward it naturally during the act of cutting. The knife is held in place by a clamp, $k$, secured by a set-screw, $l$, or by other suitable means.

D represents a fragment of the embroidered sheet, in which $m$ is one length of the raised embroidery.

On one side of the bar C is a small V-shaped groove extending longitudinally on the lower edge, as shown most clearly in the enlarged cross-section, Fig. 4. This groove forms a guide, which runs against the outer edge of the raised embroidery and keeps the knife in place. The knife, by being set at an angle, as described, constantly draws in toward the embroidery, keeping the guide against the embroidery. At the inner end of the guide is a bevel, s, as shown in the bottom view, Fig. 3, which assists in keeping the bar in place and prevents overriding.

The operation is as follows: The sheet is first adjusted in position on the bed, as before described. The bars C C are then slid along over the frame B till each one comes in proper position over the sheet and rests against a line of the embroidery, as specified. The sheet is then drawn through by the hands or otherwise, and will be cut into strips at regular and uniform distances from the embroidered edges. The work is very rapidly done and in better condition then can be done by cutting with shears. A great deal of labor and much time are saved. By the use of the arms C', pivoted to the bars C, the latter are allowed free movement laterally, to adapt themselves to the line of embroidery, which would not be the case if stiff bars were used.

The jointing of the bars, as described, allows the stiff front end of the bar to swing in one direction and the other laterally, so that the gage will follow the embroidery, whatever may be the irregularities in the same.

Having described my invention, what I claim as new, and desire to secure by Letters Patent, is—

1. In an apparatus for slitting embroidery, the combination of a bed upon which the embroidered sheet is laid, a friction device for holding the sheet in position as it is drawn forward, and one or more bars resting upon the bed and over the sheet and guided by the raised line of embroidery, and provided with a knife to do the slitting, as herein described.

2. The combination of a bed upon which the sheet is laid, one or more bars provided with knives resting over the bed and upon the sheet, and guided by the raised line of embroidery, and a frame to which the bar or bars are attached, serving as a friction device for controlling the sheet, and as an elevator to raise the bar or bars above the sheet, as specified.

3. The combination of the bed A, provided with the raised portion A', the frame B, pivoted at its rear so as to be elevated at its front, and the bars C, resting on the frame and attached at the rear, and the knives f, attached to the front ends of the bars, as herein shown and described.

4. In an apparatus for slitting embroidery, the combination of the knife-bar adapted to rest upon the cloth, and the arm pivoted to its rear end and provided with means for attachment to a support behind, as set forth.

5. In an apparatus for slitting embroidery, a knife-bar adapted to rest upon the cloth, and provided at one lower edge with a guide of such length as to extend from point to point of the embroidery, as set forth.

6. In an apparatus for slitting embroidery, the combination of a bed upon which the embroidered sheet is laid, and two or more knife-bars resting thereon, capable of lateral adjustment on their supports, to be fitted to the lines of embroidery on the sheet, as set forth.

In witness whereof I have hereunto signed my name in the presence of two subscribing witnesses.

JONATHAN B. WEST.

Witnesses:
R. F. OSGOOD,
Z. L. DAVIS.